US010069628B2

(12) United States Patent
Tomishima (10) Patent No.: US 10,069,628 B2
(45) Date of Patent: Sep. 4, 2018

(54) TECHNOLOGIES FOR PHYSICALLY UNCLONABLE FUNCTIONS WITH MAGNETIC TUNNEL JUNCTIONS (71) Applicant: Intel Corporation, Santa Clara, CA (US)

(72) Inventor: Shigeki Tomishima, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 134 days.

(21) Appl. No.: 15/280,292

(22) Filed: Sep. 29, 2016

(65) Prior Publication Data
US 2018/0091300 A1    Mar. 29, 2018

(51) Int. Cl.
*H04L 9/32* (2006.01)
*H04L 9/08* (2006.01)
*G11C 11/16* (2006.01)
*H04L 9/14* (2006.01)

(52) U.S. Cl.
CPC .......... *H04L 9/0894* (2013.01); *G11C 11/161* (2013.01); *G11C 11/1673* (2013.01); *G11C 11/1675* (2013.01); *H04L 9/0861* (2013.01); *H04L 9/14* (2013.01); *H04L 9/3278* (2013.01)

(58) Field of Classification Search
None
See application file for complete search history.

(56) References Cited

U.S. PATENT DOCUMENTS

| 2010/0277971 | A1* | 11/2010 | Slaughter | G11C 11/161 |
| | | | | 365/158 |
| 2011/0122674 | A1* | 5/2011 | Lin | G11C 11/16 |
| | | | | 365/145 |
| 2013/0058157 | A1* | 3/2013 | Wolf | G11C 11/14 |
| | | | | 365/158 |
| 2014/0048894 | A1 | 2/2014 | Li et al. | |
| 2015/0071431 | A1 | 3/2015 | Zhu et al. | |
| 2015/0071432 | A1 | 3/2015 | Zhu et al. | |
| 2016/0013940 | A1 | 1/2016 | Augustine et al. | |
| 2016/0196860 | A1 | 7/2016 | Buhrman et al. | |

(Continued)

OTHER PUBLICATIONS

International search report for PCT application No. PCT/US2017/047538, dated Nov. 8, 2017 (3 pages).

(Continued)

*Primary Examiner* — David Le
(74) *Attorney, Agent, or Firm* — Barnes & Thornburg LLP (57) ABSTRACT Technologies for a physically unclonable function with magnetic tunnel junctions (MTJs) is disclosed. An MTJ may have a fixed layer and a free layer. The MTJ may have two stable states: one in which the orientation of the magnetization of the fixed layer is parallel to the free layer, and one in which it is antiparallel. If the magnetic tunnel junction has a voltage-controlled magnetic anisotropy, when a voltage is applied across the MTJ, the orientation of the magnetic field of the free layer of the MTJ may be perpendicular to that of the fixed layer. When the voltage is removed, the orientation of the magnetization of the free layer relaxes back to one of the two stable configurations. Which state the free layer ends up at may not be predictable at the time of manufacture, but may be repeatable due to influences from variations in the manufacturing process.

25 Claims, 7 Drawing Sheets (56) References Cited

U.S. PATENT DOCUMENTS

2017/0214532 A1\* 7/2017 Das ..................... H04L 9/3278

OTHER PUBLICATIONS

Written opinion for PCT application No. PCT/US2017/047538, dated Nov. 8, 2017 (5 pages).
J. Das et al., "A Novel Geometry Based MRAM PUF," IEEE International Conference on nanotechnology, Aug. 2014.
E. I. Vatajelu et al., "STT-MRAM-Based Strong PUF Architecture," IEEE Computer Society Annual Symposium on VLSI, 2015.
Le Zhang et al., "Highly Reliable Memory-based Physical Unclonable Function Using Spin-Transfer Torque MRAM," IEEE Trans. On Information Forensics and Security, vol. 10, Issue. 8, Jul. 2015.
T. Marukame et al., "Extracting Physically Unclonable Function From Spin Transfer Switching Characteristics in Magnetic Tunnel Junctions," IEEE Trans. On Magnetics, vol. 50, No. 11, Jul. 2014.
H. Noguchi, et al, "Highly Reliable and Low-Power Nonvolatile Cache Memory with Advanced Perpendicular STT-MRAM for High-Performance CPU", Symp. VLSI, (Jun. 2014).
A. Kawasumi et al, "Circuit Techniques in Realizing Voltage-generator-less STT MRAM Suitable for Normally-off-type Non-volatile L2 Cache Memory", International Memory Workshop (IMW) 2013.
J. Vinasco, "Voltage-Controlled Magnetic Dynamics in Nanoscale Magnetic Tunnel Junctions," Ph.D. Thesis, University of California Los Angeles (2014).

\* cited by examiner

TECHNOLOGIES FOR PHYSICALLY UNCLONABLE FUNCTIONS WITH MAGNETIC TUNNEL JUNCTIONS

BACKGROUND

A physically unclonable function (PUF) implemented in an electronic circuit can be used to securely store information even when the general layout of the PUF circuit is known. A PUF can be used to securely authenticate a compute device or to securely communicate with the compute device.

Magnetic tunnel junctions can be used to store data. In a magnetic tunnel junction, an insulator is sandwiched between a ferromagnetic fixed layer and a ferromagnetic free layer, and the orientation of a magnetization in a free layer relative to the orientation of a magnetization in a fixed layer is used to store a bit of data. The relative orientation of the magnetization of the free and fixed layers affects the resistance across the junction due to tunnel magnetoresistance, and so the orientation can be measured by measuring the resistance across the junction.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
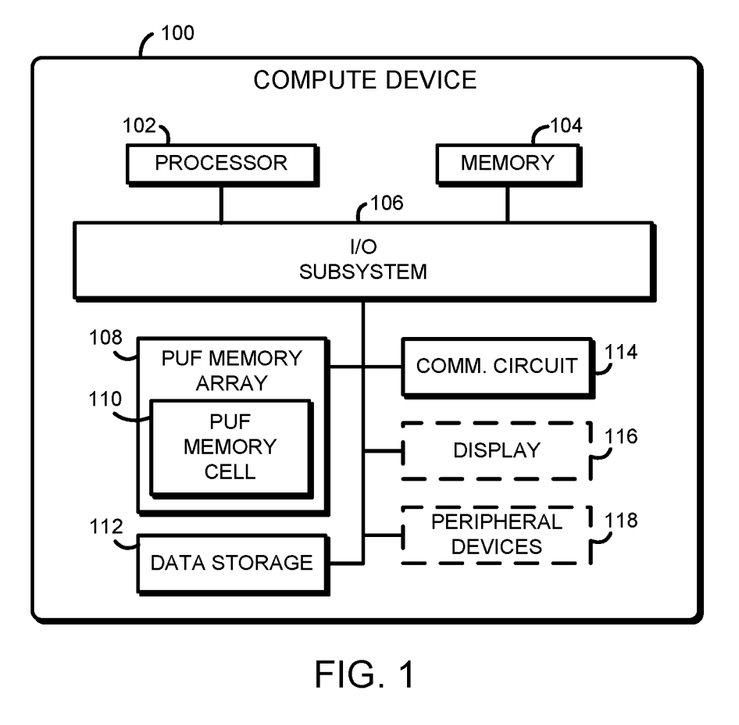
FIG. 1 is a simplified block diagram of at least one embodiment of a compute device for unclonable key storage.

Referring now to FIG. 1, an illustrative compute device 100 includes a physically unclonable function (PUF) memory array 108, which includes several PUF memory cells 110. The PUF memory array 108 can be used to implement a physically unclonable function. In some cases, a physically unclonable function is embodied as an electrical circuit or other physical component that accepts an input (a "challenge") and determines an output ("response") based on the function implemented by the physical component. In such cases, the physically unclonable function performs a literal function, i.e., a mapping of the challenge input to the response output. The function that the component performs is generally not known at the time of manufacturing, but can only be known by testing the physical component after it is manufactured. More generally, a physically unclonable function may include a component whose performance is unknown at the time of manufacture but is repeatable (and therefore can be used for storing or accessing information). In other words, a PUF need not actually implement a function in the form of mapping a challenge input to a response output, but may just store information that is unpredictable at the time of manufacture.

An illustrative PUF memory cell 110 has a magnetic tunnel junction, which is made up of a layer of a ferromagnetic material with a fixed magnetization (the fixed layer) and a layer of a ferromagnetic material with a free magnetization (the free layer). The magnetic tunnel junction has a voltage-controlled magnetic anisotropy (VCMA), so the stable orientation (or orientations) of the magnetic field of the free layer changes when a certain voltage (such as over one volt) is applied across the junction. In the illustrative embodiment, when no voltage is applied, the stable orientation of the magnetic field of the free layer is either parallel or antiparallel to the orientation of the magnetic field of the fixed layer, and, when a voltage of, for example, one volt is applied across the junction, the stable orientation of the magnetic field of the free layer is perpendicular to the orientation of the magnetic field of the fixed layer. When the voltage across the junction is removed, the perpendicular orientation is unstable, so the magnetic field of the free layer relaxes back to either parallel or antiparallel to the magnetic field of the fixed layer. In an ideal device, each relaxed orientation (i.e., parallel or antiparallel) may occur with an equal probability of 50%. Realistically, variations in the manufacturing of each individual PUF memory cell 110 such as thickness and uniformity of the fixed and free layers will affect the probability of relaxing to each orientation. The probabilities will be different for each PUF memory cell 110, even if each PUF memory cell 110 is manufactured with the same technique on the same chip at the same time.

In use and as described in more detail below, the different probability for the magnetization of the free layer of each PUF memory cell 110 to relax into a parallel or antiparallel orientation relative to the magnetization of the fixed layer is used to implement a physically unclonable function. The compute device 100 initializes the PUF memory cells 110 by applying a voltage across the junction of each PUF memory cell 110 and then removing the voltage to allow the magnetization of the free layer to relax. Each time the PUF memory cells 110 are initialized, the values stored in the PUF memory cells 110 will preferably be the same. However, in some embodiments, some errors may occur that must be handled with an error-correcting code. For example, a given PUF memory cell 110 might have a 25% for the orientation of the magnetization of the free layer relative to the fixed layer to relax to a parallel orientation and a 75% chance to relax to an antiparallel orientation. Any given time the PUF memory cell 110 is initialized, it may relax to either a parallel or antiparallel magnetic orientation, but most of the time the PUF memory cell 110 will relax to an antiparallel magnetic orientation. Since the resistance of the magnetic tunnel junction depends on the relative orientation of the magnetic fields of the fixed and free layers, the relative orientation can be used to store a bit of data (e.g., "0" for parallel and "1" for antiparallel).

Once the PUF memory cells 110 are initialized, the compute device 100 reads the value stored in each PUF memory cell 110. Since the values stored in the PUF memory cells 110 may have errors, the compute device 100 processes the values using error-correction techniques to produce a secure key. The secure key may then be used for secure communication, such as for authentication or encrypted communication. It should be appreciated that, in some embodiments, the error rate may be low enough that error-correction techniques are not required.

The illustrative compute device 100 may be embodied as any type of compute device capable of performing the functions described herein. For example, the compute device 100 may be embodied as or otherwise be included in, without limitation, a smartcard, a smartphone, a cellular phone, a wearable computer, an embedded computing system, a System-on-a-Chip (SoC), a tablet computer, a notebook computer, a laptop computer, a server computer, a desktop computer, a handset, a messaging device, a camera device, a multiprocessor system, a processor-based system, a consumer electronic device, and/or any other computing device.

The illustrative compute device 100 includes a processor 102, a memory 104, an input/output (I/O) subsystem 106, the PUF memory array 108, data storage 112, and a communication circuit 114. In some embodiments, one or more of the illustrative components of the compute device 100 may be incorporated in, or otherwise form a portion of, another component. For example, the memory 104, or portions thereof, may be incorporated in the processor 102 in some embodiments.

The processor 102 may be embodied as any type of processor capable of performing the functions described herein. For example, the processor 102 may be embodied as a single or multi-core processor(s), a single or multi-socket processor, a digital signal processor, a graphics processor, a microcontroller, or other processor or processing/controlling circuit. Similarly, the memory 104 may be embodied as any type of volatile or non-volatile memory or data storage capable of performing the functions described herein. In operation, the memory 104 may store various data and software used during operation of the compute device 100 such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104, and other components of the compute device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 102, the memory 104, and other components of the compute device 100 on a single integrated circuit chip.

The PUF memory array 108 includes several PUF memory cells 110. The PUF memory array 108 may form a part or all of the memory 104, and may in some embodiments be used as the main memory of the compute device 100. The physical structure of the PUF memory array 108 and PUF memory cells 110 is described in more detail below in regard to FIGS. 2, 3, and 7-10.

The data storage 112 may be embodied as any type of device or devices configured for the short-term or long-term storage of data. For example, the data storage 112 may be embodied as, or otherwise include, one or more solid state drives, memory devices and circuits, memory cards, hard disk drives, or other data storage devices.

The communication circuit 114 may be embodied as any communication circuit, device, or collection thereof, capable of enabling communications between the compute device 100 and other devices. To do so, the communication circuit 114 may be configured to use any one or more communication technology and associated protocols (e.g., Ethernet, Bluetooth®, Wi-Fi®, WiMAX, near field communication (NFC), etc.) to effect such communication.

Of course, in some embodiments, the compute device 100 may include additional components often found in a compute device 100, such as a display 116 and/or one or more peripheral devices 118. The peripheral devices 118 may include a keyboard, a mouse, etc.

The display 116 may be embodied as any type of display on which information may be displayed to a user of the compute device 100, such as a liquid crystal display (LCD), a light emitting diode (LED) display, a cathode ray tube (CRT) display, a plasma display, an image projector (e.g., 2D or 3D), a laser projector, a touchscreen display, a heads-up display, and/or other display technology.

Figure 2:
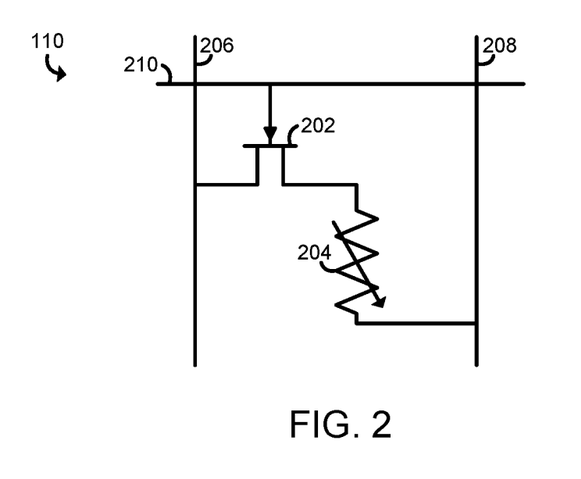
FIG. 2 is a block diagram of at least one embodiment of a PUF memory cell of a PUF memory array of the compute device of FIG. 1.

Referring now to FIG. 2, one embodiment of a PUF memory cell 110 includes a transistor 202, a magnetic tunnel junction 204, a source line 206, a bit line 208, and a word line 210. When the word line 210 is high, the transistor 202 allows current to flow through it, and the resistance level (high or low) of the magnetic tunnel junction 204 between the source line 206 and the bit line 208 can be determined, such as by driving current from the source line 206 to the bit line 208 and measuring the amount of current. The transistor 202 may be any type of transistor, such as a field effect transistor (e.g., metal-oxide semiconductor field effect transistor) or a bipolar junction transistor. It should be appreciated that the word line 210 may need to be used in order for the PUF memory cell 110 to be read as well as written to.

The magnetic tunnel junction 204 may be any magnetic tunnel junction with tunnel magnetoresistance (TMJ) across the junction and a voltage-controlled magnetic anisotropy (VCMA). As described above, the stable orientation (or orientations) of the magnetic field of the free layer change when a certain voltage (such as over one volt) is applied across the magnetic tunnel junction 204. In the illustrative embodiment, when no voltage is applied, the stable orientation of the magnetic field of the free layer is either parallel or antiparallel to the orientation of the magnetic field of the fixed layer, and, when a voltage of one volt is applied across the junction, the stable orientation of the magnetic field of the free layer is perpendicular to the orientation of the magnetic field of the fixed layer. When the voltage across the junction is removed, the perpendicular orientation is unstable, so the magnetic field of the free layer relaxes back to either parallel or antiparallel to the magnetic field of the fixed layer. Variations in the manufacturing of each PUF memory cell 110 such as, thickness, uniformity, roughness, impurities, stray magnetization, etc. of the various layers of the magnetic tunnel junction 204 and other nearby structures affect the probability of relaxing to each orientation. The probabilities will be different for each PUF memory cell 110, even if each PUF memory cell 110 is manufactured with the same technique on the same chip at the same time.

In the illustrative embodiment, the magnetic tunnel junction 204 includes three layers, a fixed layer, a free layer, and an insulator layer. The illustrative fixed and free layers are a cobalt-iron-boron alloy (CoFeB) and the illustrative insulator layer is magnesium oxide (MgO). The thickness of each layer may vary, but it should be appreciated that ultrathin layers (e.g., 1-2 nanometers) may be required for the desired TMJ and VCMA effects. It should be appreciated that, in some embodiments, the magnetic tunnel junction 204 may include additional layers, such as a layer to help pin the orientation of the magnetization of the fixed layer (such as a superlattice of alternating layers of cobalt (Co) and palladium (Pd)), a layer to provide a bias magnetization to the free layer (such as another CoFeB layer), and one or more spacers (such as one or more layers of tantalum (Ta)).

Figure 3:
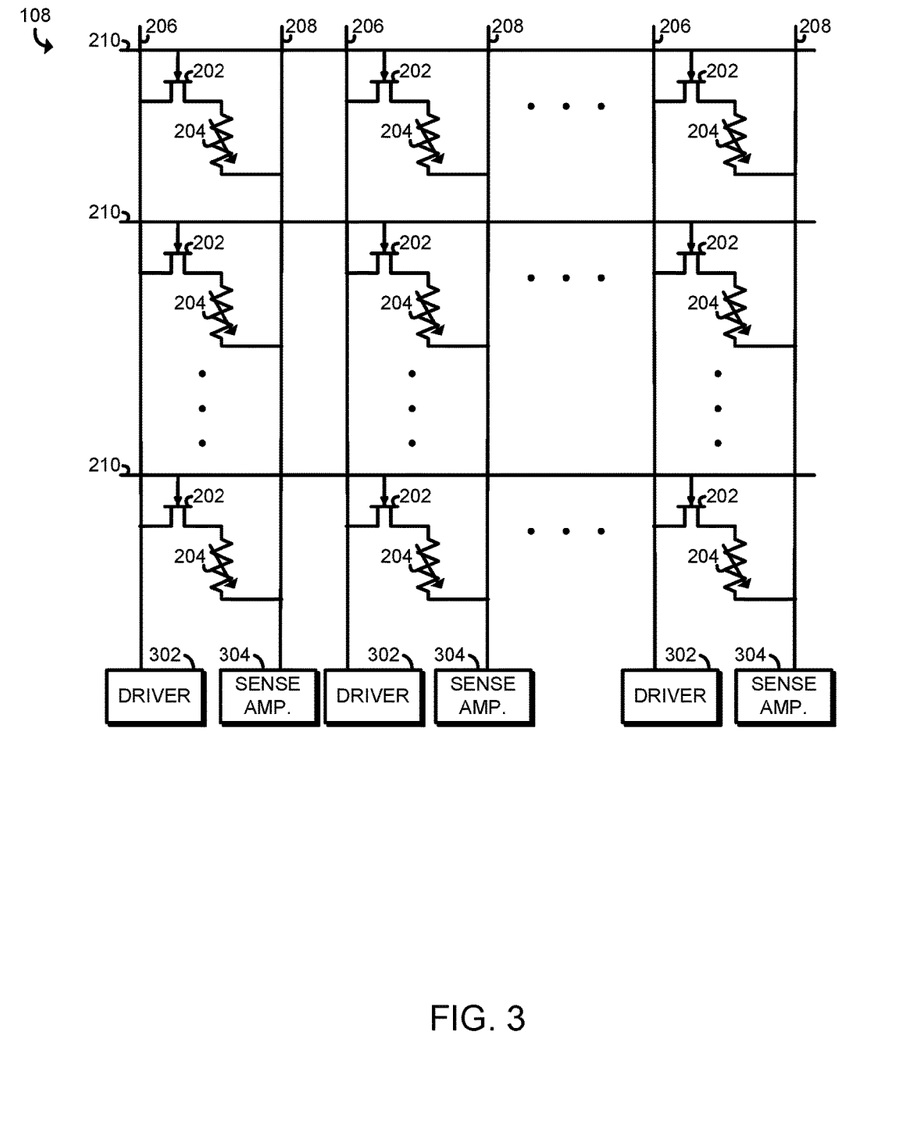
FIG. 3 is a block diagram of at least one embodiment of the PUF memory array of the compute device of FIG. 1.

Referring now to FIG. 3, one embodiment of a PUF memory array 108 includes an array of the embodiment of the PUF memory cell 110 shown in FIG. 2. The compute device 100 can control each word line 210, and can control each source line 206 with a driver 302 and measure the bit line 208 with a sense amplifier 304. The illustrative driver 302 is a voltage source, and the illustrative sense amplifier 304 amplifies the received current. In the illustrative embodiment, a relatively high voltage (such as over one volt) may be applied across the magnetic tunnel junction 204 to initialize (or otherwise write) the PUF memory cell 110, and a relatively low voltage (such as less than one half of a volt) may be used to read the PUF memory cell 110. It should be appreciated that, in some embodiments, more than one (or even all) of the PUF memory cells 110 in a single row with the same word line 210 may be read or initialized (or written) at the same time.

Figure 4:
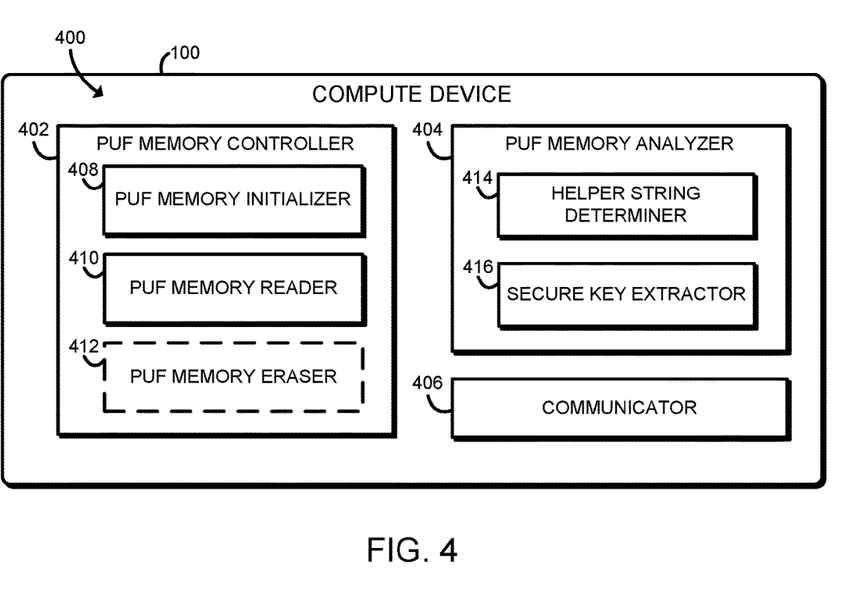
FIG. 4 is a block diagram of at least one embodiment of an environment that may be established by the compute device of FIG. 1.

Referring now to FIG. 4, in use, the compute device 100 may establish an environment 400. The illustrative environment 400 includes a PUF memory controller 402, a PUF memory analyzer 404, and a communicator 406. The various components of the environment 400 may be embodied as hardware, firmware, software, or a combination thereof. As such, in some embodiments, one or more of the components of the environment 400 may be embodied as circuitry or collection of electrical devices (e.g., a PUF memory controller circuit 402, a PUF memory analyzer circuit 404, a communicator circuit 406, etc.).

It should be appreciated that, in such embodiments, the PUF memory controller circuit 402, the PUF memory analyzer circuit 404, the communicator circuit 406, etc. may form a portion of one or more of the processor 102, the I/O subsystem 106, the PUF memory array 108, and/or other components of the compute device 100. Additionally, in some embodiments, one or more of the illustrative components may form a portion of another component and/or one or more of the illustrative components may be independent of one another. Further, in some embodiments, one or more of the components of the environment 400 may be embodied as virtualized hardware components or emulated architecture, which may be established and maintained by the processor 102 or other components of the compute device 100.

The PUF memory controller 402 is configured to control the PUF memory array 108, such as by controlling and/or measuring the word lines 210, the source lines 206, the bit lines 208, etc. The PUF memory controller 402 includes a PUF memory initializer 408, a PUF memory reader 410, and, in some embodiments, a PUF memory eraser 412.

The PUF memory initializer 408 is configured to initialize the PUF memory cells 110 such that the values of the PUF memory cells 110 are determined at least in part based on the manufacturing variations between the different PUF memory cells 110. To do so, the PUF memory initializer 408 applies a voltage across each magnetic tunnel junction 204 to bring the orientation of the magnetization of the free layer to perpendicular relative to the orientation of the fixed layer, and then removes the voltage and allows the orientation of the magnetization of the free layer to relax. As discussed above, the orientation to which each magnetic tunnel junction 204 relaxes will depend at least in part on the particular processing or manufacturing variations of that magnetic tunnel junction 204.

In the illustrative embodiment, the PUF memory initializer 408 applies a voltage (such as approximately or at least one volt) for at least a predetermined amount of time (such as 1, 2, 5, 10, 20, or 50 nanoseconds) in order for any transitory effects such as precession or oscillation of the magnetization of the free layer to end. In other embodiments, the PUF memory initializer 408 may apply the voltage for a precise amount of time, in order to take advantage of the fact that transitory effects that change the probability of relaxing into a parallel or antiparallel orientation may be different for different PUF memory cells 110, again depending on the variations that occur during manufacturing.

In the illustrative embodiment, the particular voltage applied may not matter, as long as it is above a threshold. For example, applying a voltage of 1 volt may lead to substantially the same outcome as applying a voltage of 1.5 volts, regardless of which PUF memory cell 110 is being considered. However, if the voltage applied is slightly below a threshold voltage, then the particular voltage applied may affect the probability of the free layer relaxing into a parallel or antiparallel orientation, and that effect may be different for different PUF memory cells 110, again depending on the variations that occur during manufacturing. In some embodiments, the PUF memory initializer 408 may apply a precise voltage, in order to take advantage of the fact that different PUF memory cells 110 respond differently to different voltages. In still other embodiments, the PUF memory initializer 408 may both apply a precise voltage and apply that voltage for a precise time.

In the illustrative embodiment, the PUF memory initializer 408 writes each PUF memory cell 110 one at a time. In some embodiments, depending on the power available or other factors such as thermal power dissipation, the PUF memory initializer 408 may initialize several or all of the PUF memory cells 110 simultaneously.

It should be appreciated that, in the illustrative embodiment, the same timing and voltages parameters are used each time the PUF memory array 108 is initialized. In some embodiments, another compute device 100 may supply the compute device 100 with a "challenge" composed of different timing and voltage parameters to use for each of the PUF memory cells 110. In such an embodiment, the values to which the PUF memory cells 110 are initialized will depend on the parameters given as a part of a challenge.

The PUF memory reader 410 is configured to read the values stored in the PUF memory cells 110. In the illustrative embodiment of a PUF memory array 108 shown in FIG. 3, the PUF memory reader 410 reads the value stored in a PUF memory cell 110 by applying a voltage across the PUF memory cell 110 and determining the current passing through it, as described above in regard to FIG. 3. It should be appreciated that, in some embodiments, the PUF memory reader 410 may read the PUF memory cells 110 in a different manner, depending on the particular architecture of the PUF memory array 108 and PUF memory cells 110.

In some embodiments, once initialized by the PUF memory initializer 408, the values stored in the PUF memory cells 110 may be allowed to remain stored. In other embodiments, the PUF memory eraser 412 may erase the PUF memory cells 110 for security purposes. To do so, the PUF memory eraser 412 may overwrite the PUF memory cells 110. The PUF memory eraser 412 may use any appropriate technique to overwrite the PUF memory cells 110, such as by applying an external magnetic field (either to one or more individual PUF memory cells 110 or to the entire PUF memory array 108), which would bias the orientation of the magnetization to which the free layer of each PUF memory cell 110 relaxes when an applied voltage is removed. Of course, the PUF memory eraser 412 may use standard techniques to write to a PUF memory cell 110, such as by using spin-transfer torque or applying a voltage that is a precise voltage level and/or applied for a precise amount of time. It should be appreciated that the PUF memory eraser 412 does not need to write a particular value to any PUF memory cell 110, but only needs to remove any correlation between what was previously stored after initialization and what is stored after erasure.

The PUF memory analyzer 404 is configured to analyze the PUF memory values that are read by the PUF memory reader 410. The PUF memory analyzer 404 includes a helper string determiner 414 and a secure key extractor 416. In the illustrative embodiment, when the PUF memory initializer 408 first initializes the PUF memory cells 110, the PUF memory analyzer 404 performs a mapping of the PUF memory values to a secure key, and the helper string determiner 414 also determines a helper string that can be used in combination with later values of the PUF memory values to generate the same secure key. It should be appreciated that the secure key cannot be determined from the helper string alone. When the PUF memory analyzer 404 receives PUF memory values from a subsequent initialization the secure key extractor 416 is able to extract the same secure key with use of the helper string using standard techniques such as a fuzzy extractor. It should be appreciated that, due to the noise inherent in the initialization process, the PUF memory values from a subsequent initialization will not be the same as the first PUF memory values, and the bit error rate may be high, such as over 1, 2, 5, 10, or 20 percent. In some embodiments, the PUF memory analyzer 404 may not include a helper string determiner 414, and the secure key extractor 416 may be able to extract the same secure key without use of the helper string.

The communicator 406 is configured to communicate with another compute device using any suitable communication technology and associated protocols (e.g., Ethernet, Bluetooth®, Wi-Fi®, WiMAX, near field communication (NFC), etc.). In the illustrative embodiment, once the PUF memory array 108 is first initialized and the PUF memory analyzer 404 first generates the secure key, the communicator 406 sends the secure key to another compute device. When secure communication is then later required, the PUF memory analyzer 404 may again determine the secure key, and the communicator 406 may use the secure key to securely communicate with another compute device. In the illustrative embodiment, the secure key is used as an encryption key to encrypt and decrypt communication with another compute device. In other embodiments, the secure key may be used as part of an authentication protocol in order for the other compute device with which the communicator 406 is communicating to verify that the compute device 100 has access to the secure key, and no encrypted messages may be exchanged.

Figure 5:
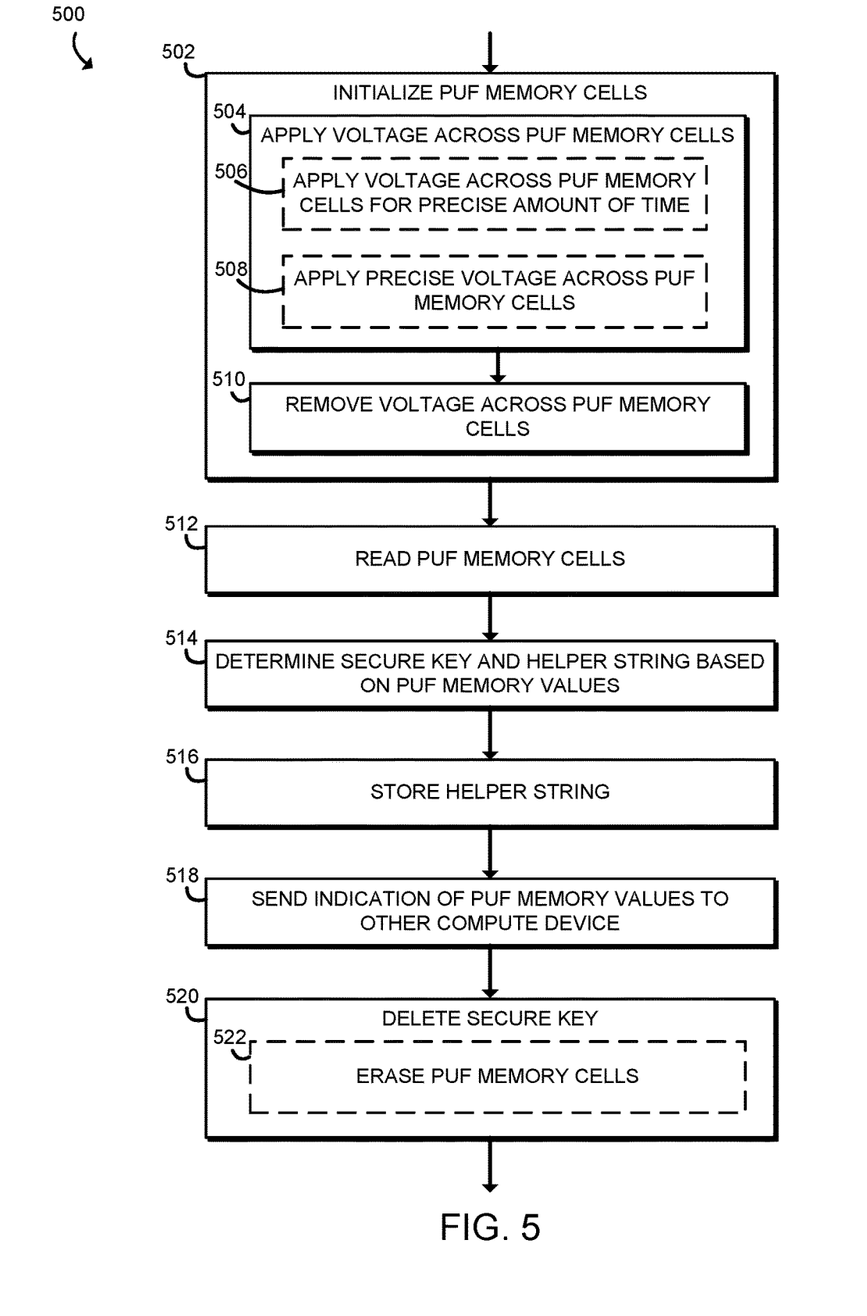
FIG. 5 is a simplified flow diagram of at least one embodiment of a method for sharing a secure key based on the PUF memory array that may be executed by the compute device of FIG. 1.

Referring now to FIG. 5, in use, the compute device 100 may execute a method 500 for determining the secure key the first time. The method 500 begins in block 502, in which the compute device 100 initializes the PUF memory cells 110. To do so, the compute device 100 applies a voltage across each of the PUF memory cells 110 in block 504. In some embodiments, the compute device 100 may apply a voltage across the PUF memory cells 110 for a precise amount of time in block 506, and/or may apply a precise voltage across the PUF memory cells 110 in block 508. The compute device 100 then removes the voltage across the PUF memory cells 110 in block 510. It should be appreciated that, in some embodiments, the compute device 100 may remove the voltage by lowering the voltage below a threshold voltage, and may not completely remove the voltage by lowering the voltage to zero.

In block 512, the compute device 100 reads the PUF memory cells 110. In some embodiments, the compute device 100 may perform the initialization process several times, and take the value that each PUF memory cell 110 relaxes to the most as the read value of that PUF memory cell 110.

In block 514, the compute device 100 determines a secure key and a helper string based on the PUF memory values. The compute device 100 stores the helper string in block 516. It should be appreciated that, in some embodiments, the helper string may not be used or generated at all.

In block 518, the compute device 100 sends an indication of the PUF memory values to another compute device. In the illustrative embodiment, the compute device 100 sends the secure key directly to the other compute device. Additionally or alternatively, the compute device 100 may send the PUF memory values and the other compute device can determine the secure key in the same manner as the compute device 100.

In block 520, the compute device 100 deletes the secure key from the compute device 100 for security purposes. In some embodiments, compute device 100 may also erase the PUF memory cells 110, such as by overwriting all of the PUF memory cells 110 with a certain value in block 522.

Figure 6:
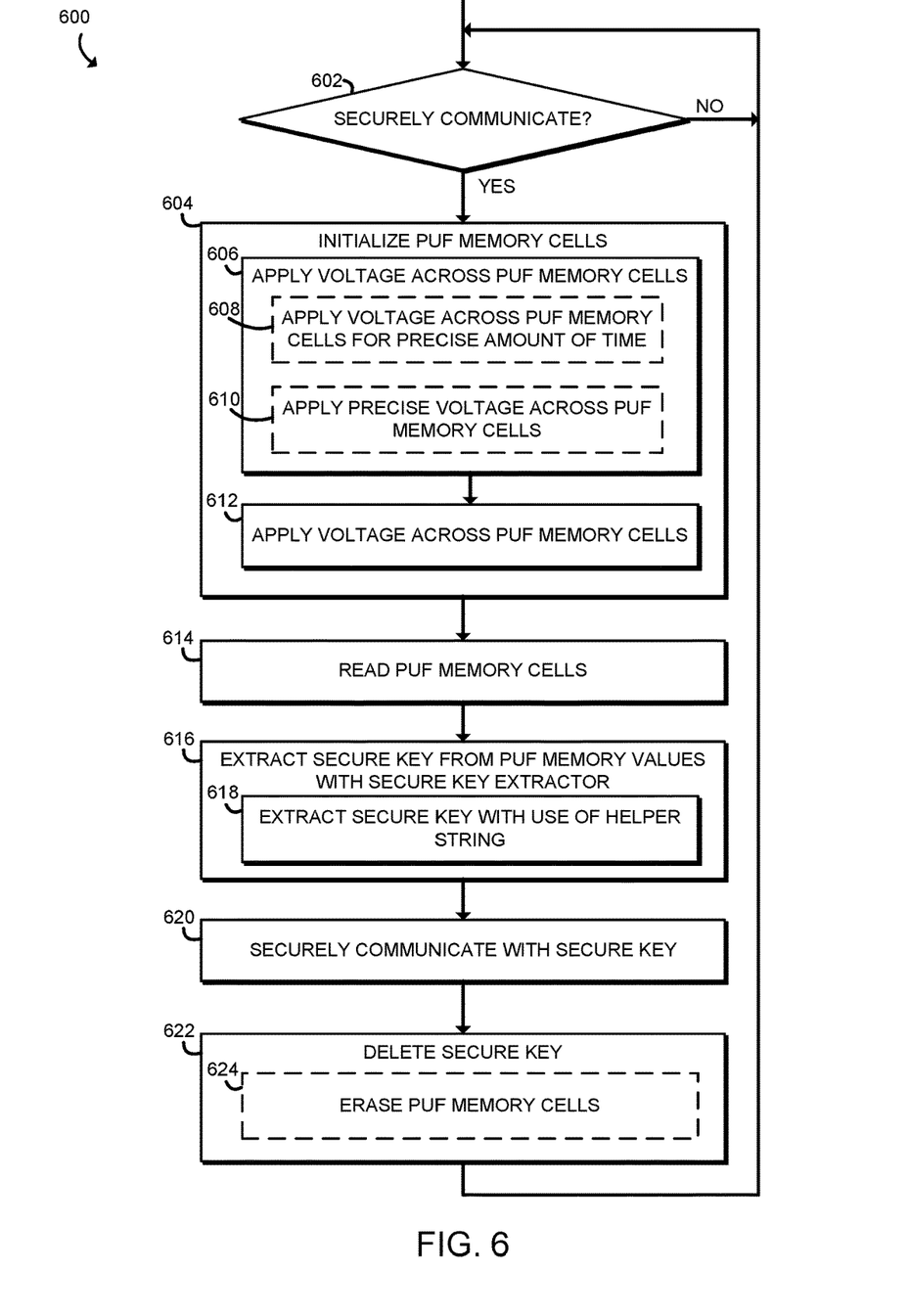
FIG. 6 is a simplified flow diagram of at least one embodiment of a method for secure communication based on the PUF memory array that may be executed by the compute device of FIG. 1.

Referring now to FIG. 6, in use, the compute device 100 may execute a method 600 for securely communicating based on the PUF memory cells 110. The method 600 begins in block 602, in which the compute device 100 chooses whether to securely communicate with another compute device. The compute device 100 may securely communicate with the other compute device for any reason, such as an application on the compute device 100 so requested or the other compute device initiated a secure communication. In some embodiments, if secure communication is requested by another compute device, the compute device 100 may authenticate the request before initializing the PUF memory cells 110. If the compute device 100 is to securely communicate, the method 600 proceeds to block 604. If the compute device 100 is not to securely communicate, the method 600 loops back to block 602.

In block 604, the compute device 100 initializes the PUF memory cells 110. To do so, the compute device 100 applies a voltage cross each of the PUF memory cells 110 in block 604. In some embodiments, the compute device 100 may apply a voltage across the PUF memory cells 110 for a precise amount of time in block 608, and/or may apply a precise voltage across the PUF memory cells 110 in block 610. The compute device 100 then removes the voltage across the PUF memory cells 110 in block 612. It should be appreciated that, in some embodiments, the compute device 100 may remove the voltage by lowering the voltage below a threshold voltage, and may not completely remove the voltage by lowering the voltage to zero.

In block 614, the compute device 100 reads the PUF memory cells 110. In some embodiments, the compute device 100 may perform the initialization process several times, and take the value that each PUF memory cell 110 relaxes to the most as the read value of that PUF memory cell 110.

In block 616, the compute device 100 extracts a secure key from the PUF memory values with a secure key extractor. In block 618, in some embodiments, the compute device 100 extracts the secure key with use of a helper string stored in the compute device 100.

In block 620, the compute device 100 securely communicates with another compute device with the secure key. In the illustrative embodiment, the secure key is used as an encryption key to encrypt and decrypt communication with the other compute device. In other embodiments, the secure key may be used as part of an authentication protocol in order for the other compute device to verify that the compute device 100 has access to the secure key, and no encrypted messages may be exchanged.

In block 622, the compute device 100 deletes the secure key from the compute device 100 for security purposes. In some embodiments, compute device 100 may also erase the PUF memory cells 110, such as by overwriting all of the PUF memory cells 110 with a certain value in block 624.

Figure 7:
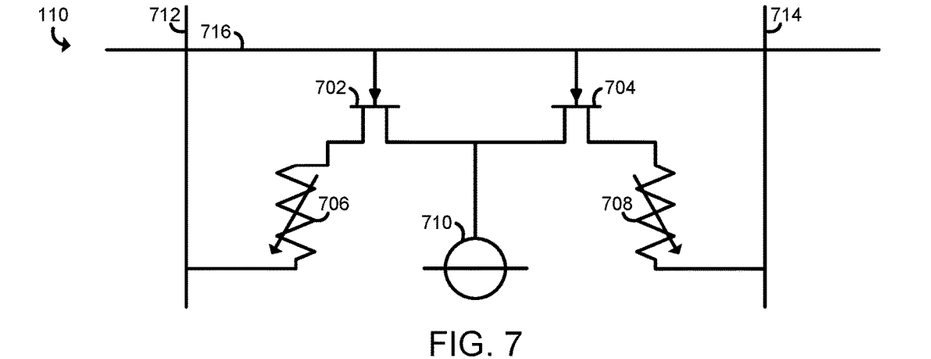
FIG. 7 is a block diagram of at least one embodiment of a PUF memory cell of a PUF memory array of the compute device of FIG. 1.

Referring now to FIG. 7, an additional or alternative embodiment of a PUF memory cell 110 includes a first transistor 702, a second transistor 704, a first MTJ 706, a second MTJ 708, a voltage supply 710, a select line 712, a complementary select line 714, and a word line 716. Each of the transistors 702, 704 and MTJs 706, 708 are similar to the transistor 202 and the MTJ 204 described in regard to FIG. 2 above. In some embodiments with the structure shown in FIG. 7, the orientation of the magnetization of the free layer relative to the fixed layer of the first MTJ 706 for a valid state is always complementary to (i.e. opposite) the orientation of the magnetization of the free layer relative to the fixed layer of the second MTJ 708. This ensures that, for a valid state, the resistance of one of the MTJs 706, 708 is always high and the resistance of the other MTJ 706, 708 is always low. Which one is high is used to store a single bit. For example, if the resistance of MTJ 706 is higher than the resistance of MTJ 708, the PUF memory cell 110 is considered to store a "0," and if the resistance of MTJ 706 is less than the resistance of MTJ 708, the PUF memory cell 110 is considered to store a "1." One advantage of the configuration shown in FIG. 7 is that the relative resistance of the MTJs 706, 708 can be measured through a differential measurement by comparing the current passing from the voltage supply 710 through the select line 712 compared to the complementary select line 714. The PUF memory cell 110 can be written by controlling the voltage on the select line 712 and the complementary select line 714 relative to the voltage of the voltage supply 710. In use as a PUF memory cell 110, the two MTJs 706, 708 may not always relax to different resistance states. In such cases, the initialization of the PUF memory cell 110 may be repeated, the value of the PUF memory cell 110 may be discarded, the value read from the PUF memory cell 110 may be used anyway (even if the actual value stored in the PUF memory cell 110 is indefinite), or all four possible states of the PUF memory cell 110 may be used as valid states.

Figure 8:
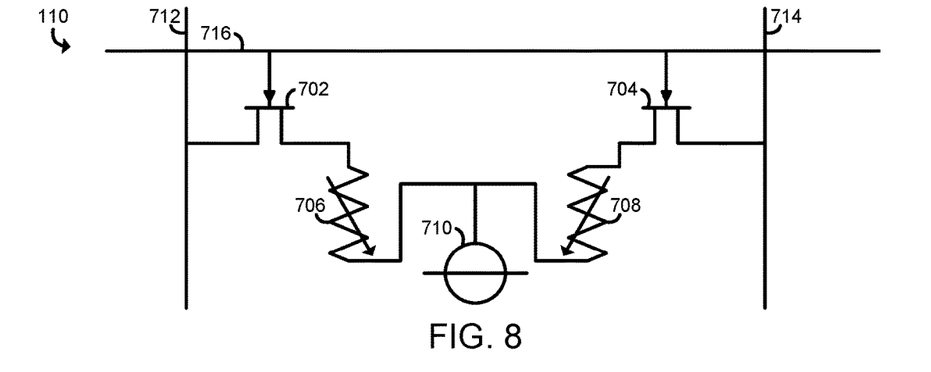
FIG. 8 is a block diagram of at least one embodiment of a PUF memory cell of a PUF memory array of the compute device of FIG. 1.
Figure 9:
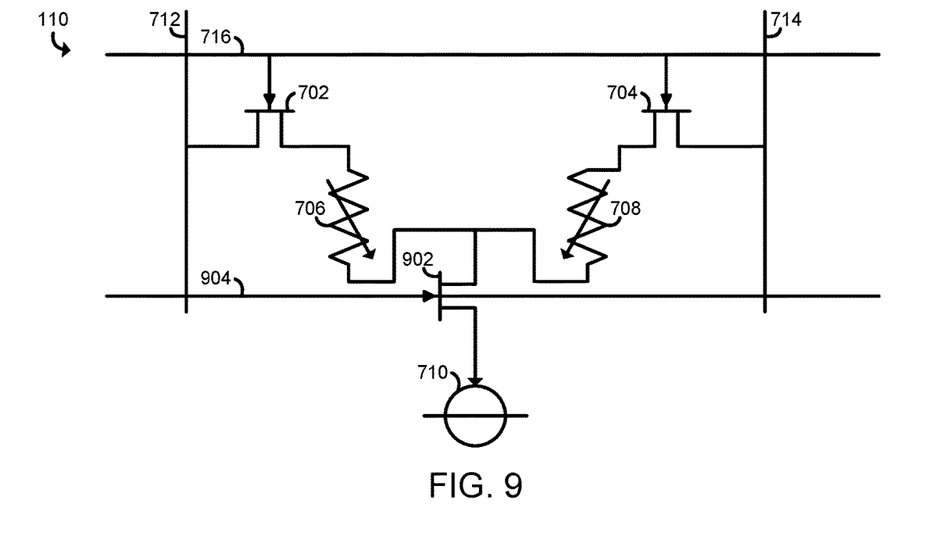
FIG. 9 is a block diagram of at least one embodiment of a PUF memory cell of a PUF memory array of the compute device of FIG. 1.
Figure 10:
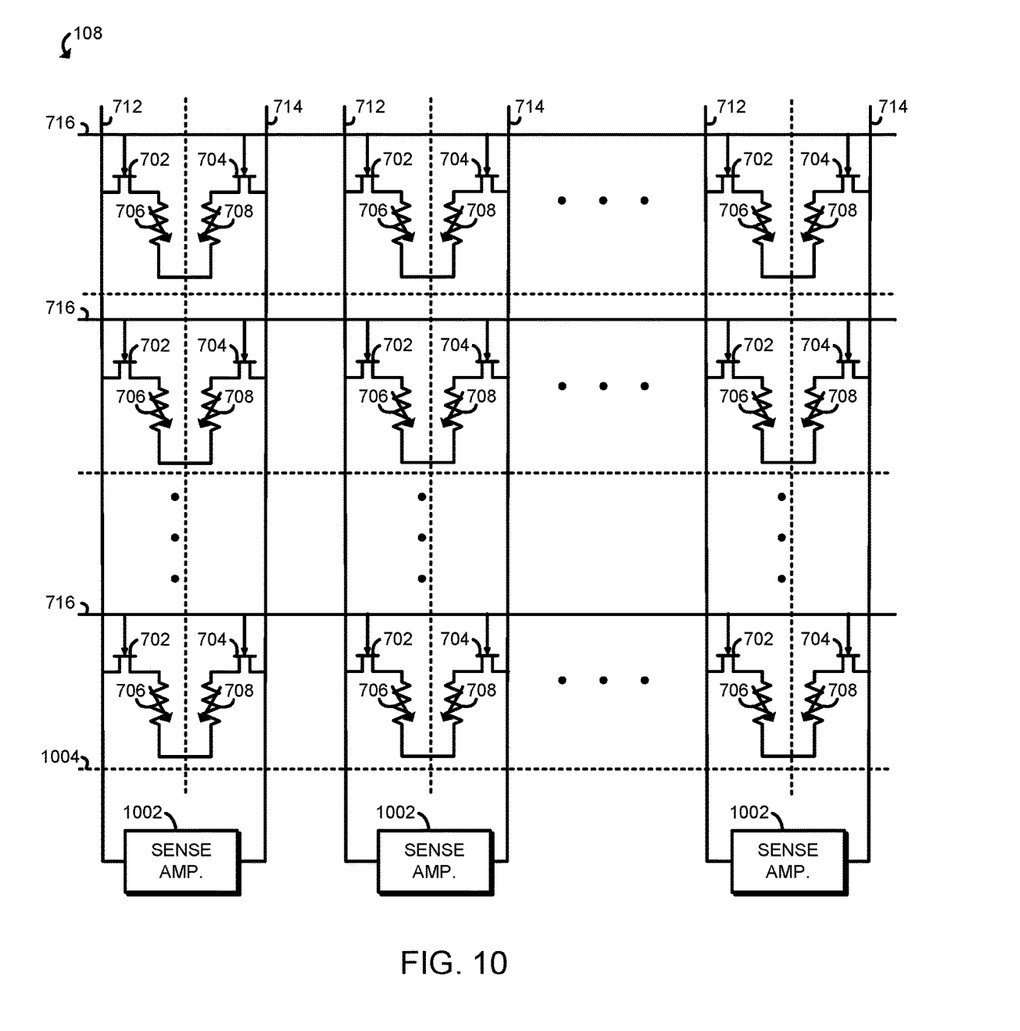
FIG. 10 is a block diagram of at least one embodiment of the PUF memory array of the compute device of FIG. 1.

Referring now to FIG. 8, an additional or alternative embodiment of a PUF memory cell 110 includes the same components as shown in FIG. 7, but with a different configuration. Referring now to FIG. 9, an additional or alternative embodiment of a PUF memory cell 110 includes the same components as shown in FIG. 8 with the same configuration of the transistors 702, 704 and MTJs 706, 708, but with a third transistor 902 controlled by a second word line 904. The addition of the third transistor 902 and the second word line 904 may allow for a simpler writing procedure, since the voltage supply 710 can be disconnected. As such, the MTJs 706, 708 may be written by passing the same current through both of them, from the select line 712 to the complementary select line 714 (or vice-versa).

Referring now to FIG. 9, an additional or alternative embodiment of a PUF memory array 108 includes several PUF memory cells 110 of the embodiment shown in FIG. 8. Each select line 712 and complementary select line 714 is connected to a sense amplifier 1002, which is configured to compare the currents on the two select lines 712, 714 during a read operation and determine which is higher. The voltage supply 710 for each PUF memory cell 110 is connected to a meshed voltage supply 1004. It should be appreciated that, in some embodiments, a PUF memory array 108 similar to that shown in FIG. 10 could use the embodiment shown in FIG. 9 for the PUF memory cells 110, and would include several second word lines 904 and several third transistors 902.

EXAMPLES

Illustrative examples of the devices, systems, and methods disclosed herein are provided below. An embodiment of the devices, systems, and methods may include any one or more, and any combination of, the examples described below.

Example 1 includes an apparatus for unclonable key storage, the apparatus comprising a plurality of physically unclonable function (PUF) memory cells, wherein each of the plurality of PUF memory cells comprises a magnetic tunnel junction comprising a fixed layer and a free layer, wherein the magnetic tunnel junction has a voltage-controlled magnetic anisotropy, and wherein each PUF memory cell of the plurality of PUF memory cells has manufacturing differences compared to each other PUF memory cell of the plurality of PUF memory cells; a PUF memory controller to initialize the plurality of PUF memory cells, wherein to initialize the plurality of PUF memory cells comprises to apply a voltage across the magnetic tunnel junction of each of the plurality of PUF memory cells such that a magnetization of each free layer is approximately perpendicular to a magnetization of the corresponding fixed layer; and remove the voltage from each of the plurality of PUF memory cells to allow the magnetization of each free layer to relax to a parallel orientation or an antiparallel orientation compared to the magnetization of the corresponding fixed layer, wherein the orientation to which the magnetization of the free layer relaxes at least partially depends on the manufacturing differences of the corresponding PUF memory cell; and read each of the plurality of PUF memory cells to determine a plurality of PUF memory values; and a PUF memory analyzer to extract a secure key from the plurality of PUF memory values.

Example 2 includes the subject matter of Example 1, and wherein the PUF memory controller is further to erase the plurality of PUF memory cells.

Example 3 includes the subject matter of any of Examples 1 and 2, and wherein to extract the secure key from the plurality of PUF memory values comprises to access a helper string stored on the apparatus; and extract the secure key from the plurality of PUF memory values with a fuzzy extractor based on the helper string.

Example 4 includes the subject matter of any of Examples 1-3, and wherein the manufacturing differences between each PUF memory cell of the plurality of PUF memory cells on which the orientation to which the magnetization of the free layer relaxes at least partially depends are from uncontrolled fluctuations in the manufacturing process of the plurality of PUF memory cells.

Example 5 includes the subject matter of any of Examples 1-4, and further including a communicator to receive, from another apparatus, a first encrypted message; decrypt the first encrypted message based on the secure key; encrypt a second message; and send, to the other apparatus, the encrypted second message.

Example 6 includes the subject matter of any of Examples 1-5, and further including a communicator to receive, from another apparatus, a request for authentication; determine an authentication message based on the secure key and the request for authentication; and send, to the other apparatus, the authentication message.

Example 7 includes the subject matter of any of Examples 1-6, and wherein the PUF memory controller is further to initialize the plurality of PUF memory cells a second time after extracting the secure key, wherein to initialize the plurality of PUF memory cells a second time comprises to apply the voltage to each of the plurality of PUF memory cells a second time such that the magnetization of each free layer is approximately perpendicular to the magnetization of the corresponding fixed layer; and remove the voltage from each of the plurality of PUF memory cells a second time to allow the magnetization of each free layer to relax to the parallel orientation or the antiparallel orientation compared to the magnetization of the corresponding fixed layer, wherein the orientation to which the magnetization of the free layer relaxes at least partially depends on the manufacturing differences of the corresponding PUF memory; and read each of the plurality of PUF memory cells a second time to determine a second plurality of PUF memory values, wherein at least ten percent of the values between the plurality of PUF memory values and the second plurality of PUF memory values are different, and wherein the PUF memory analyzer is further to extract the secure key from the second plurality of PUF memory values.

Example 8 includes the subject matter of any of Examples 1-7, and wherein each of the plurality of PUF memory cells consists of one transistor, one magnetic tunnel junction, and electrical connections.

Example 9 includes the subject matter of any of Examples 1-8, and wherein to read each of the plurality of PUF memory cells comprises to apply, for each of the plurality of PUF memory cells, a second voltage across the corresponding magnetic tunnel junction; and determine, for each of the plurality of PUF memory cells, a current across the corresponding magnetic tunnel junction while the second voltage is applied.

Example 10 includes the subject matter of any of Examples 1-9, and wherein each of the plurality of PUF memory cells consists of three transistors, two magnetic tunnel junctions, and electrical connections.

Example 11 includes the subject matter of any of Examples 1-10, and wherein to read each of the plurality of PUF memory cells comprises to apply, for each of the plurality of PUF memory cells, a second voltage across each of the corresponding magnetic tunnel junctions; and determine, for each of the plurality of PUF memory cells, a difference between a current across one corresponding magnetic tunnel junction and a current across the other corresponding magnetic tunnel junction while the second voltage is applied.

Example 12 includes the subject matter of any of Examples 1-11, and wherein each of the fixed layer and free layer of each magnetic tunnel junction of the plurality of PUF memory cells consists essentially of cobalt, iron, and boron.

Example 13 includes the subject matter of any of Examples 1-12, and wherein each magnetic tunnel junction of the plurality of PUF memory cells further comprises an insulating layer of magnesium oxide between each corresponding free layer and fixed layer.

Example 14 includes a method for unclonable key storage on a compute device, the method comprising initializing, by the compute device, a plurality of physically unclonable function (PUF) memory cells, wherein each of the plurality of PUF memory cells comprises a magnetic tunnel junction comprising a fixed layer and a free layer, wherein the magnetic tunnel junction has a voltage-controlled magnetic anisotropy, and wherein initializing the plurality of PUF memory cells comprises applying a voltage across the magnetic tunnel junction of each of the plurality of PUF memory cells such that a magnetization of each free layer is approximately perpendicular to a magnetization of the corresponding fixed layer; and removing the voltage from each of the plurality of PUF memory cells to allow the magnetization of each free layer to relax to a parallel orientation or an antiparallel orientation compared to the magnetization of the corresponding fixed layer, wherein the orientation to which the magnetization of the free layer relaxes at least partially depends on manufacturing differences of the corresponding PUF memory cell compared to the other PUF memory cells of the plurality of PUF memory cells; reading, by the compute device, each of the plurality of PUF memory cells to determine a plurality of PUF memory values; and extracting, by the compute device, a secure key from the plurality of PUF memory values.

Example 15 includes the subject matter of Example 14, and further including erasing, by the compute device, the plurality of PUF memory cells.

Example 16 includes the subject matter of any of Examples 14 and 15, and wherein extracting the secure key from the plurality of PUF memory values comprises accessing a helper string stored on the compute device; and extracting the secure key from the plurality of PUF memory values with a fuzzy extractor based on the helper string.

Example 17 includes the subject matter of any of Examples 14-16, and wherein the manufacturing differences between each PUF memory cell of the plurality of PUF memory cells on which the orientation to which the magnetization of the free layer relaxes at least partially depends are from uncontrolled fluctuations in the manufacturing process of the plurality of PUF memory cells.

Example 18 includes the subject matter of any of Examples 14-17, and further including receiving, by the compute device and from another compute device, a first encrypted message; decrypting, by the compute device, the first encrypted message based on the secure key; encrypting, by the compute device, a second message; and sending, by the compute device and to the other compute device, the encrypted second message.

Example 19 includes the subject matter of any of Examples 14-18, and further including receiving, by the compute device and from another compute device, a request for authentication; determining, by the compute device, an authentication message based on the secure key and the request for authentication; and sending, by the compute device and to the other compute device, the authentication message.

Example 20 includes the subject matter of any of Examples 14-19, and further including initializing, by the compute device, the plurality of PUF memory cells a second time after extracting the secure key, wherein initializing the plurality of PUF memory cells a second time comprises applying the voltage to each of the plurality of PUF memory cells a second time such that the magnetization of each free layer is approximately perpendicular to the magnetization of the corresponding fixed layer; and removing the voltage from each of the plurality of PUF memory cells a second time to allow the magnetization of each free layer to relax to the parallel orientation or the antiparallel orientation compared to the magnetization of the corresponding fixed layer, wherein the orientation to which the magnetization of the free layer relaxes at least partially depends on the manufacturing differences of the corresponding PUF memory cell compared to the other PUF memory cells of the plurality of PUF memory cells; reading, by the compute device, each of the plurality of PUF memory cells a second time to determine a second plurality of PUF memory values, wherein at least ten percent of the values between the plurality of PUF memory values and the second plurality of PUF memory values are different; and extracting, by the compute device, the secure key from the second plurality of PUF memory values.

Example 21 includes the subject matter of any of Examples 14-20, and wherein each of the plurality of PUF memory cells consists of one transistor, one magnetic tunnel junction, and electrical connections.

Example 22 includes the subject matter of any of Examples 14-21, and wherein reading each of the plurality of PUF memory cells comprises applying, for each of the plurality of PUF memory cells, a second voltage across the corresponding magnetic tunnel junction; and determining, for each of the plurality of PUF memory cells, a current across the corresponding magnetic tunnel junction while the second voltage is applied.

Example 23 includes the subject matter of any of Examples 14-22, and wherein each of the plurality of PUF memory cells consists of three transistors, two magnetic tunnel junctions, and electrical connections.

Example 24 includes the subject matter of any of Examples 14-23, and wherein reading each of the plurality of PUF memory cells comprises applying, for each of the plurality of PUF memory cells, a second voltage across each of the corresponding magnetic tunnel junctions; and determining, for each of the plurality of PUF memory cells, a difference between a current across one corresponding magnetic tunnel junction and a current across the other corresponding magnetic tunnel junction while the second voltage is applied.

Example 25 includes the subject matter of any of Examples 14-24, and wherein each of the fixed layer and free layer of each magnetic tunnel junction of the plurality of PUF memory cells consists essentially of cobalt, iron, and boron.

Example 26 includes the subject matter of any of Examples 14-25, and wherein each magnetic tunnel junction of the plurality of PUF memory cells further comprises an insulating layer of magnesium oxide between each corresponding free layer and fixed layer.

Example 27 includes one or more computer-readable media comprising a plurality of instructions stored thereon that, when executed, causes a compute device to perform the method of any of Examples 14-26.

Example 28 includes a compute device for unclonable key storage on a compute device, the compute device comprising means for initializing a plurality of physically unclonable function (PUF) memory cells, wherein each of the plurality of PUF memory cells comprises a magnetic tunnel junction comprising a fixed layer and a free layer, wherein the magnetic tunnel junction has a voltage-controlled magnetic anisotropy, and wherein the means for initializing the plurality of PUF memory cells comprises means for applying a voltage across the magnetic tunnel junction of each of the plurality of PUF memory cells such that a magnetization of each free layer is approximately perpendicular to a magnetization of the corresponding fixed layer; and means for removing the voltage from each of the plurality of PUF memory cells to allow the magnetization of each free layer to relax to a parallel orientation or an antiparallel orientation compared to the magnetization of the corresponding fixed layer, wherein the orientation to which the magnetization of the free layer relaxes at least partially depends on manufacturing differences of the corresponding PUF memory cell compared to the other PUF memory cells of the plurality of PUF memory cells; means for reading each of the plurality of PUF memory cells to determine a plurality of PUF memory values; and means for extracting a secure key from the plurality of PUF memory values.

Example 29 includes the subject matter of Example 28, and further including means for erasing the plurality of PUF memory cells.

Example 30 includes the subject matter of any of Examples 28 and 29, and wherein the means for extracting the secure key from the plurality of PUF memory values comprises means for accessing a helper string stored on the compute device; and means for extracting the secure key from the plurality of PUF memory values with a fuzzy extractor based on the helper string.

Example 31 includes the subject matter of any of Examples 28-30, and wherein the manufacturing differences between each PUF memory cell of the plurality of PUF memory cells on which the orientation to which the magnetization of the free layer relaxes at least partially depends are from uncontrolled fluctuations in the manufacturing process of the plurality of PUF memory cells.

Example 32 includes the subject matter of any of Examples 28-31, and further including means for receiving, from another compute device, a first encrypted message; means for decrypting the first encrypted message based on the secure key; means for encrypting a second message; and means for sending, to the other compute device, the encrypted second message.

Example 33 includes the subject matter of any of Examples 28-32, and further including means for receiving, from another compute device, a request for authentication; means for determining an authentication message based on the secure key and the request for authentication; and means for sending, to the other compute device, the authentication message.

Example 34 includes the subject matter of any of Examples 28-33, and further including means for initializing the plurality of PUF memory cells a second time after extracting the secure key, wherein the means for initializing the plurality of PUF memory cells a second time comprises means for applying the voltage to each of the plurality of PUF memory cells a second time such that the magnetization of each free layer is approximately perpendicular to the magnetization of the corresponding fixed layer; and means for removing the voltage from each of the plurality of PUF memory cells a second time to allow the magnetization of each free layer to relax to the parallel orientation or the antiparallel orientation compared to the magnetization of the corresponding fixed layer, wherein the orientation to which the magnetization of the free layer relaxes at least partially depends on the manufacturing differences of the corresponding PUF memory cell compared to the other PUF memory cells of the plurality of PUF memory cells; means for reading each of the plurality of PUF memory cells a second time to determine a second plurality of PUF memory values, wherein at least ten percent of the values between the plurality of PUF memory values and the second plurality of PUF memory values are different; and means for extracting the secure key from the second plurality of PUF memory values.

Example 35 includes the subject matter of any of Examples 28-34, and wherein each of the plurality of PUF memory cells consists of one transistor, one magnetic tunnel junction, and electrical connections.

Example 36 includes the subject matter of any of Examples 28-35, and wherein the means for reading each of the plurality of PUF memory cells comprises means for applying, for each of the plurality of PUF memory cells, a second voltage across the corresponding magnetic tunnel junction; and means for determining, for each of the plurality of PUF memory cells, a current across the corresponding magnetic tunnel junction while the second voltage is applied.

Example 37 includes the subject matter of any of Examples 28-36, and wherein each of the plurality of PUF memory cells consists of three transistors, two magnetic tunnel junctions, and electrical connections.

Example 38 includes the subject matter of any of Examples 28-37, and wherein the means for reading each of the plurality of PUF memory cells comprises means for applying, for each of the plurality of PUF memory cells, a second voltage across each of the corresponding magnetic tunnel junctions; and means for determining, for each of the plurality of PUF memory cells, a difference between a current across one corresponding magnetic tunnel junction and a current across the other corresponding magnetic tunnel junction while the second voltage is applied.

Example 39 includes the subject matter of any of Examples 28-38, and wherein each of the fixed layer and free layer of each magnetic tunnel junction of the plurality of PUF memory cells consists essentially of cobalt, iron, and boron.

Example 40 includes the subject matter of any of Examples 28-39, and wherein each magnetic tunnel junction of the plurality of PUF memory cells further comprises an insulating layer of magnesium oxide between each corresponding free layer and fixed layer.

Example 41 includes a system for unclonable key storage, the system comprising a plurality of physically unclonable function (PUF) memory cells, wherein each of the plurality of PUF memory cells comprises a magnetic tunnel junction comprising a fixed layer and a free layer, wherein the magnetic tunnel junction has a voltage-controlled magnetic anisotropy, and wherein each PUF memory cell of the plurality of PUF memory cells has manufacturing differences compared to each other PUF memory cell of the plurality of PUF memory cells; a PUF memory controller to initialize the plurality of PUF memory cells, wherein to initialize the plurality of PUF memory cells comprises to apply a voltage across the magnetic tunnel junction of each of the plurality of PUF memory cells such that a magnetization of each free layer is approximately perpendicular to a magnetization of the corresponding fixed layer; and remove the voltage from each of the plurality of PUF memory cells to allow the magnetization of each free layer to relax to a parallel orientation or an antiparallel orientation compared to the magnetization of the corresponding fixed layer, wherein the orientation to which the magnetization of the free layer relaxes at least partially depends on the manufacturing differences of the corresponding PUF memory cell; and read each of the plurality of PUF memory cells to determine a plurality of PUF memory values; a PUF memory analyzer to extract a secure key from the plurality of PUF memory values; and a communication circuit to securely communicate with another system based on the secure key.

Example 42 includes the subject matter of Example 41, and wherein the PUF memory controller is further to erase the plurality of PUF memory cells.

Example 43 includes the subject matter of any of Examples 41 and 42, and wherein to extract the secure key from the plurality of PUF memory values comprises to access a helper string stored on the system; and extract the secure key from the plurality of PUF memory values with a fuzzy extractor based on the helper string.

Example 44 includes the subject matter of any of Examples 41-43, and wherein the manufacturing differences between each PUF memory cell of the plurality of PUF memory cells on which the orientation to which the magnetization of the free layer relaxes at least partially depends are from uncontrolled fluctuations in the manufacturing process of the plurality of PUF memory cells.

Example 45 includes the subject matter of any of Examples 41-44, and wherein to securely communicate with the other system comprises to receive, from the other system, a first encrypted message; decrypt the first encrypted message based on the secure key; encrypt a second message; and send, to the other system, the encrypted second message.

Example 46 includes the subject matter of any of Examples 41-45, and wherein to securely communicate with the other system comprises to receive, from the other system, a request for authentication; determine an authentication message based on the secure key and the request for authentication; and send, to the other system, the authentication message.

Example 47 includes the subject matter of any of Examples 41-46, and wherein the PUF memory controller is further to initialize the plurality of PUF memory cells a second time after extracting the secure key, wherein to initialize the plurality of PUF memory cells a second time comprises to apply the voltage to each of the plurality of PUF memory cells a second time such that the magnetization of each free layer is approximately perpendicular to the magnetization of the corresponding fixed layer; and remove the voltage from each of the plurality of PUF memory cells a second time to allow the magnetization of each free layer to relax to the parallel orientation or the antiparallel orientation compared to the magnetization of the corresponding fixed layer, wherein the orientation to which the magnetization of the free layer relaxes at least partially depends on the manufacturing differences of the corresponding PUF memory; and read each of the plurality of PUF memory cells a second time to determine a second plurality of PUF memory values, wherein at least ten percent of the values between the plurality of PUF memory values and the second plurality of PUF memory values are different, and wherein the PUF memory analyzer is further to extract the secure key from the second plurality of PUF memory values.

Example 48 includes the subject matter of any of Examples 41-47, and wherein each of the plurality of PUF memory cells consists of one transistor, one magnetic tunnel junction, and electrical connections.

Example 49 includes the subject matter of any of Examples 41-48, and wherein to read each of the plurality of PUF memory cells comprises to apply, for each of the plurality of PUF memory cells, a second voltage across the corresponding magnetic tunnel junction; and determine, for each of the plurality of PUF memory cells, a current across the corresponding magnetic tunnel junction while the second voltage is applied.

Example 50 includes the subject matter of any of Examples 41-49, and wherein each of the plurality of PUF memory cells consists of three transistors, two magnetic tunnel junctions, and electrical connections.

Example 51 includes the subject matter of any of Examples 41-50, and wherein to read each of the plurality of PUF memory cells comprises to apply, for each of the plurality of PUF memory cells, a second voltage across each of the corresponding magnetic tunnel junctions; and determine, for each of the plurality of PUF memory cells, a difference between a current across one corresponding magnetic tunnel junction and a current across the other corresponding magnetic tunnel junction while the second voltage is applied.

Example 52 includes the subject matter of any of Examples 41-51, and wherein each of the fixed layer and free layer of each magnetic tunnel junction of the plurality of PUF memory cells consists essentially of cobalt, iron, and boron.

Example 53 includes the subject matter of any of Examples 41-52, and wherein each magnetic tunnel junction of the plurality of PUF memory cells further comprises an insulating layer of magnesium oxide between each corresponding free layer and fixed layer.

The invention claimed is:

1. An apparatus for unclonable key storage, the apparatus comprising:
a plurality of physically unclonable function (PUF) memory cells, wherein each of the plurality of PUF memory cells comprises a magnetic tunnel junction comprising a fixed layer and a free layer, wherein the magnetic tunnel junction has a voltage-controlled magnetic anisotropy, and wherein each PUF memory cell of the plurality of PUF memory cells has manufacturing differences compared to each other PUF memory cell of the plurality of PUF memory cells;
a PUF memory controller to:
  initialize the plurality of PUF memory cells, wherein to initialize the plurality of PUF memory cells comprises to:
    apply a voltage across the magnetic tunnel junction of each of the plurality of PUF memory cells such that a magnetization of each free layer is approximately perpendicular to a magnetization of the corresponding fixed layer; and
    remove the voltage from each of the plurality of PUF memory cells to allow the magnetization of each free layer to relax to a parallel orientation or an antiparallel orientation compared to the magnetization of the corresponding fixed layer, wherein the orientation to which the magnetization of the free layer relaxes at least partially depends on the manufacturing differences of the corresponding PUF memory cell; and
  read each of the plurality of PUF memory cells to determine a plurality of PUF memory values; and
a PUF memory analyzer to extract a secure key from the plurality of PUF memory values.

2. The apparatus of claim 1, wherein the PUF memory controller is further to erase the plurality of PUF memory cells.

3. The apparatus of claim 1, wherein to extract the secure key from the plurality of PUF memory values comprises to:
access a helper string stored on the apparatus; and
extract the secure key from the plurality of PUF memory values with a fuzzy extractor based on the helper string.

4. The apparatus of claim 1, wherein the manufacturing differences between each PUF memory cell of the plurality of PUF memory cells on which the orientation to which the magnetization of the free layer relaxes at least partially depends are from uncontrolled fluctuations in the manufacturing process of the plurality of PUF memory cells.

5. The apparatus of claim 1, further comprising a communicator to:
receive, from another apparatus, a first encrypted message;
decrypt the first encrypted message based on the secure key;
encrypt a second message; and
send, to the other apparatus, the encrypted second message.

6. The apparatus of claim 1, wherein the PUF memory controller is further to:
initialize the plurality of PUF memory cells a second time after extracting the secure key, wherein to initialize the plurality of PUF memory cells a second time comprises to:
apply the voltage to each of the plurality of PUF memory cells a second time such that the magnetization of each free layer is approximately perpendicular to the magnetization of the corresponding fixed layer; and
remove the voltage from each of the plurality of PUF memory cells a second time to allow the magnetization of each free layer to relax to the parallel orientation or the antiparallel orientation compared to the magnetization of the corresponding fixed layer, wherein the orientation to which the magnetization of the free layer relaxes at least partially depends on the manufacturing differences of the corresponding PUF memory; and
read each of the plurality of PUF memory cells a second time to determine a second plurality of PUF memory values, wherein at least ten percent of the values between the plurality of PUF memory values and the second plurality of PUF memory values are different, and
wherein the PUF memory analyzer is further to extract the secure key from the second plurality of PUF memory values.

7. The apparatus of claim 1, wherein each of the plurality of PUF memory cells consists of one transistor, one magnetic tunnel junction, and electrical connections.

8. The apparatus of claim 7, wherein to read each of the plurality of PUF memory cells comprises to:
apply, for each of the plurality of PUF memory cells, a second voltage across the corresponding magnetic tunnel junction; and
determine, for each of the plurality of PUF memory cells, a current across the corresponding magnetic tunnel junction while the second voltage is applied.

9. The apparatus of claim 1, wherein each of the plurality of PUF memory cells consists of three transistors, two magnetic tunnel junctions, and electrical connections.

10. The apparatus of claim 9, wherein to read each of the plurality of PUF memory cells comprises to:
apply, for each of the plurality of PUF memory cells, a second voltage across each of the corresponding magnetic tunnel junctions; and
determine, for each of the plurality of PUF memory cells, a difference between a current across one corresponding magnetic tunnel junction and a current across the other corresponding magnetic tunnel junction while the second voltage is applied.

11. The apparatus of claim 1, wherein each of the fixed layer and free layer of each magnetic tunnel junction of the plurality of PUF memory cells consists essentially of cobalt, iron, and boron.

12. A method comprising:
initializing, by a compute device, a plurality of physically unclonable function (PUF) memory cells, wherein each of the plurality of PUF memory cells comprises a magnetic tunnel junction comprising a fixed layer and a free layer, wherein the magnetic tunnel junction has a voltage-controlled magnetic anisotropy, and wherein initializing the plurality of PUF memory cells comprises:
applying a voltage across the magnetic tunnel junction of each of the plurality of PUF memory cells such that a magnetization of each free layer is approximately perpendicular to a magnetization of the corresponding fixed layer; and
removing the voltage from each of the plurality of PUF memory cells to allow the magnetization of each free layer to relax to a parallel orientation or an antiparallel orientation compared to the magnetization of the corresponding fixed layer, wherein the orientation to which the magnetization of the free layer relaxes at least partially depends on manufacturing differences of the corresponding PUF memory cell compared to the other PUF memory cells of the plurality of PUF memory cells;
reading, by the compute device, each of the plurality of PUF memory cells to determine a plurality of PUF memory values; and
extracting, by the compute device, a secure key from the plurality of PUF memory values.

13. The method of claim 12, further comprising erasing, by the compute device, the plurality of PUF memory cells.

14. The method of claim 12, wherein extracting the secure key from the plurality of PUF memory values comprises:
accessing a helper string stored on the compute device; and
extracting the secure key from the plurality of PUF memory values with a fuzzy extractor based on the helper string.

15. The method of claim 12, wherein the manufacturing differences between each PUF memory cell of the plurality of PUF memory cells on which the orientation to which the magnetization of the free layer relaxes at least partially depends are from uncontrolled fluctuations in the manufacturing process of the plurality of PUF memory cells.

16. The method of claim 12, further comprising:
receiving, by the compute device and from another compute device, a first encrypted message;
decrypting, by the compute device, the first encrypted message based on the secure key;
encrypting, by the compute device, a second message; and
sending, by the compute device and to the other compute device, the encrypted second message.

17. The method of claim 12, further comprising:
initializing, by the compute device, the plurality of PUF memory cells a second time after extracting the secure key, wherein initializing the plurality of PUF memory cells a second time comprises:
applying the voltage to each of the plurality of PUF memory cells a second time such that the magnetization of each free layer is approximately perpendicular to the magnetization of the corresponding fixed layer; and removing the voltage from each of the plurality of PUF memory cells a second time to allow the magnetization of each free layer to relax to the parallel orientation or the antiparallel orientation compared to the magnetization of the corresponding fixed layer, wherein the orientation to which the magnetization of the free layer relaxes at least partially depends on the manufacturing differences of the corresponding PUF memory cell compared to the other PUF memory cells of the plurality of PUF memory cells;

reading, by the compute device, each of the plurality of PUF memory cells a second time to determine a second plurality of PUF memory values, wherein at least ten percent of the values between the plurality of PUF memory values and the second plurality of PUF memory values are different; and extracting, by the compute device, the secure key from the second plurality of PUF memory values.

18. The method of claim 12, wherein each of the plurality of PUF memory cells consists of one transistor, one magnetic tunnel junction, and electrical connections.

19. The method of claim 18, wherein reading each of the plurality of PUF memory cells comprises:

applying, for each of the plurality of PUF memory cells, a second voltage across the corresponding magnetic tunnel junction; and determining, for each of the plurality of PUF memory cells, a current across the corresponding magnetic tunnel junction while the second voltage is applied.

20. A system for unclonable key storage, the system comprising:

a plurality of physically unclonable function (PUF) memory cells, wherein each of the plurality of PUF memory cells comprises a magnetic tunnel junction comprising a fixed layer and a free layer, wherein the magnetic tunnel junction has a voltage-controlled magnetic anisotropy, and wherein each PUF memory cell of the plurality of PUF memory cells has manufacturing differences compared to each other PUF memory cell of the plurality of PUF memory cells;

a PUF memory controller to:

initialize the plurality of PUF memory cells, wherein to initialize the plurality of PUF memory cells comprises to:

apply a voltage across the magnetic tunnel junction of each of the plurality of PUF memory cells such that a magnetization of each free layer is approximately perpendicular to a magnetization of the corresponding fixed layer; and remove the voltage from each of the plurality of PUF memory cells to allow the magnetization of each free layer to relax to a parallel orientation or an antiparallel orientation compared to the magnetization of the corresponding fixed layer, wherein the orientation to which the magnetization of the free layer relaxes at least partially depends on the manufacturing differences of the corresponding PUF memory cell; and read each of the plurality of PUF memory cells to determine a plurality of PUF memory values;

a PUF memory analyzer to extract a secure key from the plurality of PUF memory values; and a communication circuit to securely communicate with another system based on the secure key.

21. The system of claim 20, wherein the PUF memory controller is further to erase the plurality of PUF memory cells.

22. The system of claim 20, wherein to extract the secure key from the plurality of PUF memory values comprises to:

access a helper string stored on the system; and extract the secure key from the plurality of PUF memory values with a fuzzy extractor based on the helper string.

23. The system of claim 20, wherein the manufacturing differences between each PUF memory cell of the plurality of PUF memory cells on which the orientation to which the magnetization of the free layer relaxes at least partially depends are from uncontrolled fluctuations in the manufacturing process of the plurality of PUF memory cells.

24. The system of claim 20, wherein to securely communicate with the other system comprises to:

receive, from the other system, a first encrypted message;

decrypt the first encrypted message based on the secure key;

encrypt a second message; and send, to the other system, the encrypted second message.

25. The system of claim 20, wherein the PUF memory controller is further to:

initialize the plurality of PUF memory cells a second time after extracting the secure key, wherein to initialize the plurality of PUF memory cells a second time comprises to:

apply the voltage to each of the plurality of PUF memory cells a second time such that the magnetization of each free layer is approximately perpendicular to the magnetization of the corresponding fixed layer; and remove the voltage from each of the plurality of PUF memory cells a second time to allow the magnetization of each free layer to relax to the parallel orientation or the antiparallel orientation compared to the magnetization of the corresponding fixed layer, wherein the orientation to which the magnetization of the free layer relaxes at least partially depends on the manufacturing differences of the corresponding PUF memory; and read each of the plurality of PUF memory cells a second time to determine a second plurality of PUF memory values, wherein at least ten percent of the values between the plurality of PUF memory values and the second plurality of PUF memory values are different, and wherein the PUF memory analyzer is further to extract the secure key from the second plurality of PUF memory values.

* * * * *